Nov. 6, 1962 G. JAVOR 3,062,049
LIQUID LEVEL GAUGE
Filed Aug. 13, 1957
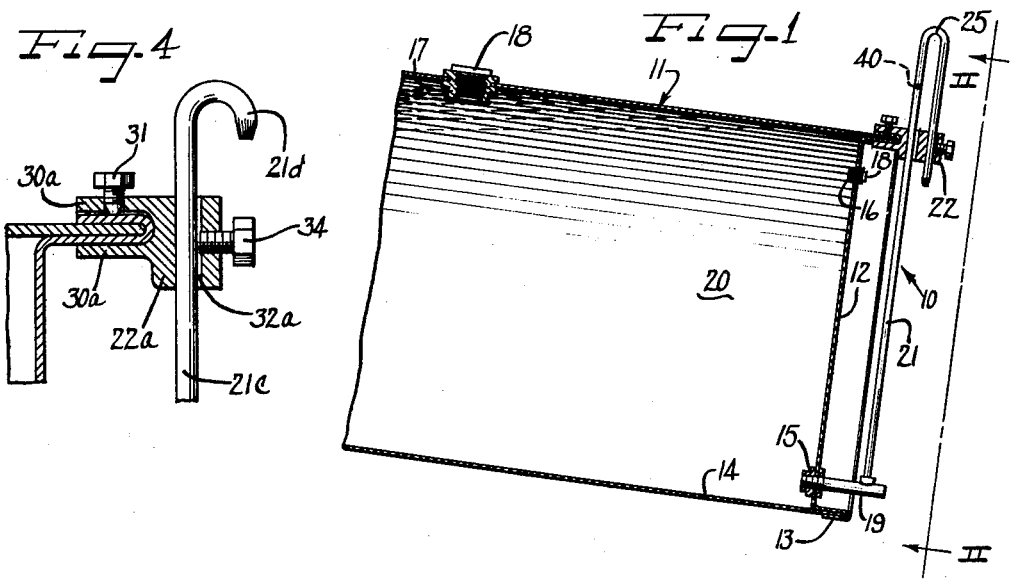
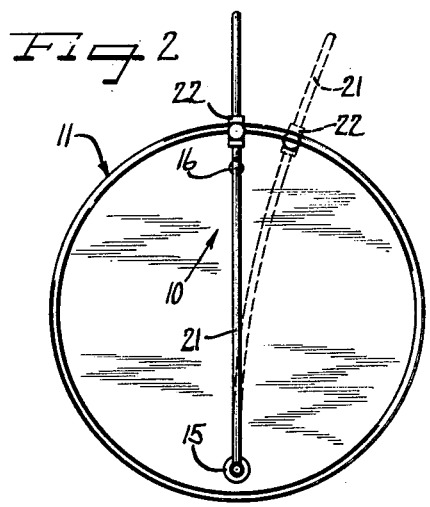
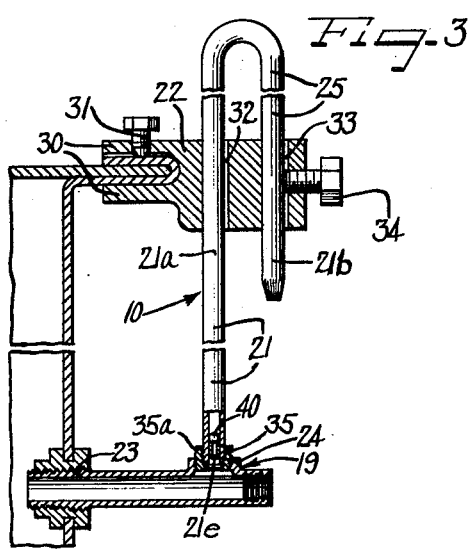
Inventor
George Javor
by Hill, Sherman, Meroni, Gross & Simpson Attys

United States Patent Office 3,062,049
Patented Nov. 6, 1962

3,062,049
LIQUID LEVEL GAUGE
George Javor, Shadyside Trailer Park, Rte. 1, Box 57, Chesterton, Ind.
Filed Aug. 13, 1957, Ser. No. 677,939
4 Claims. (Cl. 73—323)

This invention relates generally to liquid level gauges, and more specifically to a detachable sight gauge for an oil drum.

Although the principles of the present invention may be included in various liquid level or sight gauges, a particularly useful application is made in sight gauges of the larger types that require installation on an oil drum, externally thereto. When typical oil-level gauges are secured to oil drums, the various gauges themselves provide additional leakage paths through which oil fluid may escape. Furthermore, such gauges seldom have the adaptability required to enable their use on various sizes of drums. Still further, when a drum is tilted to improve the drainage of liquid therefrom, prior gauges have allowed the escape of liquid, since by tilting, the upper end of the gauge typically is below the level of liquid in the drum.

The present invention contemplates the utilization of an integral sight tube, comprising flexible material, secured to a fitting near the lower part of an oil drum, which tube extends vertically beyond the upper limits of the oil drum, and includes a downwardly directed U-shaped portion at its upper end. A bracket is provided which clamps on the rim or flange of the oil drum, and which has one or two apertures through which the U-shaped portion slidably or adjustably extends.

Accordingly, it is an object of the present invention to provide a liquid level gauge having a simple configuration.

Another object of the present invention is to provide a vented liquid level gauge which will not permit liquid to escape, even though the drum to which it is attached is tilted a considerable amount.

Yet another object of the present invention is to provide a liquid level gauge which may be externally supported by the flanged end of oil drums having various sizes, the mounting means being adjustable to accommodate the various drum sizes.

Many other advantages, features and additional objects of the present invention will become manifest to those versed in the art upon making reference to the detailed description and the accompanying drawings in which a preferred structural embodiment incorporating the principles of the present invention is shown by way of illustrative example.

On the drawings:

FIGURE 1 is a side view of a liquid level gauge provided in accordance with the principles of the present invention, and secured to an oil drum, shown in cross section;

FIGURE 2 is a view taken along line II—II of FIGURE 1;

FIGURE 3 is an enlarged cross-sectional view of the gauge shown in FIGURE 1; and FIGURE 4 illustrates a slightly different form of the upper end of the invention.

As shown on the drawings:

The principles of this invention are particularly novel and useful when embodied in a liquid level or oil gauge assembly such as illustrated in FIGURE 1, generally indicated by the numeral 10. The gauge 10 is secured to a drum 11 which has an end 12 having a circumferential or peripheral flange 13 secured to the peripheral portion 14 of the drum 11. The end 12 of the drum 11 is provided with a lower and an upper threaded opening or port, 15 and 16, while the cylindrical portion is also provided with a similar opening 17. The ports 16 and 17 are usually each provided with a closure plug 18, while the lowermost port 15 is provided with a fitting 19.

The drum 11 may be mounted with its principal axis in a horizontal direction, but more preferably, the drum 11 is so tilted that the bottom of the cylindrical portion 14 is inclined toward the port 15 to aid the drainage of liquid therefrom. It can be seen that when the tilted drum 11 is filled with a fluid 20, through the opening 17, up to the level thereof, the level of the liquid 20 within the drum 11 is above the uppermost extremity of the end 12. The gauge 10 is ideally suited for indicating the level in the drum under this set of conditions.

The gauge 10 includes a tube or tube assembly 21 and a mounting bracket 22. The fitting 19, which may comprise a shut-off valve (or which may be external to a shut-off valve), includes a set of threads 23 which is engageable with the threads in the port 15 (or in the shut-off valve). Further, the fitting 19 includes a generally upwardly directed boss 24 having a threaded aperture for receiving the lower end of the tube 21 in sealing relationship.

The tube 21 extends upwardly therefrom generally parallel to the end 12 of the drum 11, and to a point somewhat above the flange 13, where the upper end is disposed in a downwardly directed manner, forming a U-shaped portion 25 at the other end of the tube 21. The bracket 22 engages the U-shaped portion 25 and clamps onto the flange 13 of the drum 11. If desired, an opaque buoyant member or float 40 may be included within the tube 21 for giving a more easily visible indication of the liquid level.

Referring to FIGURE 2, there is shown an end view of the gauge assembly 10 secured to the drum 11. As shown in solid lines, the gauge may extend in a true vertical direction from the opening 15. However, if the drum 11 includes the port 16, and access to it is required, the gauge may be installed as shown in broken lines. Such an installation is effected since the tube 21 comprises a flexible resilient material, such as plastic, and since the connection between the bracket 22 and the tubular portion 25 of the tube 21 is frictionally adjustable. Accordingly, the tube 21 may be arcuately deformed to entirely clear the port 16 or any other obstruction, and to engage the boss 24, even though it be variably spaced from the port 15.

Referring now to FIGURE 3, the detailed construction of the gauge 10 is illustrated. The fitting 19 does not necessarily comprise a part of the gauge. However, it provides an upwardly directed threaded opening with which the gauge 10 communicates and by which one end thereof is supported. Preferably, the material from which the tube 21 is constructed is a transparent resilient flexible plastic. The length of the tube 21 may be as desired, but preferably is made somewhat longer than might be ordinarily expected, since it extends beyond the end 12 of the drum 11 with which it is to be used. The bracket 22 includes a pair of jaws 30, one of which threadably receives a cone-point set screw 31. The flange 13 of the drum 11 is received between the jaws 30, and the set screw 31 is tightened to securely position the bracket with respect to the drum 11. Further, the bracket 22 has a pair of spaced apertures 32 and 33 which extend in a generally vertical direction and transverse to the flange 13 being outwardly spaced therefrom. The two legs of the U-shaped portion 25 of the tube 21 are received within the apertures 32 and 33, the sight tube leg 21a extending through the aperture 32, and the vent tube leg 21b extending through the aperture 33. The lower end or discharge end of the vent tube leg 21b is preferably restricted so as to provide free passage for air, but to obstruct the entry of foreign matter and insects.

The U-shaped portion 25 is thus preferably integral with the tube 21 at the upper end thereof. Furthermore, the axial distance between the legs preferably is different from the axial distance between the apertures 32 and 33. Thus, as shown, the bracket 22 acts to compress the U-shaped portion 25 in a direction transverse to the length thereof, whereby frictional engagement occurs between the U-shaped portion and the walls of the apertures.

Accordingly, there is a frictional engagement provided between the U-shaped portion 25 and the bracket 22. If desired, this friction may be augmented by a dull nosed set screw 34 carried by the bracket and engaging one of the legs of the U in any convenient position. It is to be understood that the resilience of the U-shaped portion may be such that the bracket acts to compress or to expand the legs.

At the lower end of the tube 21, means are provided for attaching the tube to the fitting 19. In the form illustrated, a metallic plug 35 has sealing engagement with the lower end of the tube 21, for example by tapered pipe threads as shown, cement, or both, and has other threads for engagement with the fitting 19. Preferably, the fitting 35 has a surface 35a having at least one pair of flats onto which a tightening tool may be brought to act. Also a rigid tubular sleeve 21e may be secured within the tube 21 to prevent loss of the float 40. The sleeve 21e serves a further function. Since the tube 21 is flexible, the sleeve 21e precludes collapse of the tube 21 when the tapered pipe threads on the metal plug 35 are tightened onto the external tapered pipe threads of the tube 21. A similar sleeve may also be provided at the upper end of the tube 21. Of course, the tube may be necked-down at either or both ends to provide float restrictions. Further, the upper float and dirt restriction may be provided by necking down or flattening the bend 25. Also, where a plug 35 is used, it may include the lower float restriction.

It is apparent that the liquid 20 in the drum 11 will pass through the fitting 19 and rise in the tube 21 to seek its own level within the drum 11, thereby indicating the amount of liquid therein. Further, the air in the tube which is displaced by the rising liquid leaves through the vent leg 21b, or enters therethrough if the liquid level be falling. In addition, any lighter-than-air vapors rising from the liquid are trapped by the U-shaped portion, whereby they may escape only during filling, their temperature being assumed to be constant.

Referring now to FIGURE 4, a slightly different form for the upper end of the gauge is illustrated. The bracket 22a includes a pair of jaws 30a, one of which threadably receives a cone-point set screw 31 for engaging the drum flange 13. The bracket 22a has a single aperture 32a which extends in a direction transverse to the opening between the jaws 30a, and which is spaced outwardly therefrom. The sight tube leg 21c extends through the aperture 32a, while the vent tube leg 21d terminates in spaced relation to the bracket 22a. The lower end of the vent tube leg 21d is open but preferably is restricted to obstruct the entry of foreign matter and to prevent the loss of the buoyant float 40.

Accordingly, an oil gauge assembly has been provided which may be attached to the flanged end of various sized oil drums, the mounting means being adjustable with respect to the upper portion of the tube and engageable therewith, both resiliently and/or frictionally. Inasmuch as the tube is longer than the end of the drum, the tube will accommodate liquid levels which are higher than the end of the drum, such as may be produced by tilting the drum or angularly mounting it. Further, the gauge may be deformed to clear obstructions, may be easily installed, and has a minimum of points at which liquid leakage could possibly occur.

Although various minor modifications might be suggested by those versed in the art, it should be understood that I wish to embody within the scope of the patent warranted hereon all such embodiments as reasonably and properly come within the scope of my contribution to the art.

I claim as my invention:

1. A liquid level gauge for a drum having a flanged end and a rigid fitting secured to the lower part of the drum end, comprising in combination: a transparent liquid receiving tube having an inverted resilient U-shaped portion integral therewith at one end thereof opening directly into the atmosphere, and means at the other end thereof for attaching said tube to the rigid fitting; and a bracket having a slot defined by rigid jaw portions thereof for receiving a segment of the drum flange therein, one of said bracket jaw portions having a setscrew for clamping the same to the drum flange, said bracket having a pair of parallel spaced apertures directed transversely to and spaced from the flange slot, each of said apertures freely slidably receiving a leg of said U-shaped tube portion for adjustably directly supporting said one end; said legs of said U-shaped portion having a free position wherein the legs have a different spacing than the spacing of said apertures, and so that when assembled in said apertures, said legs are resiliently biased against said bracket within said apertures thereof respectively, thereby frictionally and slidably securing together said bracket and said tube.

2. A liquid level gauge for a drum having a flanged end and a rigid fitting secured to the lower part of the drum end, comprising in combination: a transparent yieldable-plastic liquid-receiving tube having an inverted U-shaped portion integral therewith at one end thereof and opening directly into the atmosphere, the other end of said tube having an integral set of external threads; a metallic plug having internal and external threads, said plug being sealably secured by its internal threads directly to the threaded end of said tube, the external threads of said plug being adapted to be attached to the rigid fitting for support of said threaded end of said tube; a non-yieldable rigid tubular sleeve disposed within said threaded end of said tube and operative to preclude collapse of said threaded end of said tube in response to thread tightening; a buoyant member disposed solely within said liquid-receiving tube; the opening in said rigid tubular sleeve being smaller than said buoyant member so that said sleeve further comprises an internal restriction at said threaded end of said tube to prevent escape therethrough of said buoyant member; and a bracket adapted to be clamped to the drum flange, said bracket including means defining an aperture directed transversely to the flange for adjustably receiving a leg of said U-shaped portion.

3. A liquid level gauge for a drum having an arcuate flanged end and a rigid fitting secured to the lower part of the drum end, comprising in combination: a resilient yieldable-plastic transparent liquid-receiving tube having an inverted U-shaped portion integral therewith at the upper end thereof and opening directly into the atmosphere, the other end of said tube having an integral set of external threads; a metallic plug having internal and external threads, said plug being sealably secured by its internal threads directly to the threaded end of said tube, the external threads of said plug being adapted to be attached to the rigid fitting for support of said threaded end of said tube; a non-yieldable rigid tubular sleeve disposed within said threaded end of said tube and operative to preclude collapse of said threaded end of said tube in response to thread tightening; a rigid bracket having a slot for receiving therein any one of various selected segments of the arcuate drum flange remote from the fitting, said bracket including means defining an aperture directed transversely to and spaced from the flange slot, said aperture freely slidably receiving a leg of said U-shaped tube portion for adjustably directly supporting only said upper end of said tube; and a buoyant member disposed solely within said liquid-receiving tube; said tube having an internal restriction at each of said ends to prevent the escape therefrom of said buoyant member, one of said restrictions comprising an integral constriction in the bore of said U-shaped portion of said liquid-receiving tube; the opening in said rigid tubular sleeve being smaller than said buoyant member so that said sleeve further comprises the internal restriction at said threaded end of said tube; said tube comprising flexible material, whereby said bracket may be so arcuately moved along the drum flange and clamped to the drum flange as to impart by a force applied to the upper end of said tube a selectable amount of arcuate configuration to the axis of said tube.

4. A liquid level gauge for connection to a rigid fitting, comprising in combination: a transparent yieldable-plastic liquid-receiving tube, an end of said tube having an integral set of external threads; a metallic plug having internal and external threads, said plug being sealably secured by its internal threads directly to the threaded end of said tube, the external threads of said plug being adapted to be attached to the rigid fitting for support of said threaded end of said tube; a non-yieldable rigid tubular sleeve disposed within said threaded end of said tube and operative to preclude collapse of said threaded end of said tube in response to thread tightening; and a buoyant member disposed solely within said liquid-receiving tube; the opening in said rigid tubular sleeve being smaller than said buoyant member so that said sleeve further comprises an internal restriction at said threaded end of said tube to prevent escape therethrough of said buoyant member.

References Cited in the file of this patent

UNITED STATES PATENTS

| | | |
|---|---|---|
| 672,472 | Pollatsek | Apr. 23, 1901 |
| 977,216 | Newman | Nov. 29, 1910 |
| 1,156,998 | Heberling | Oct. 19, 1915 |
| 1,607,912 | Peper | Nov. 23, 1926 |
| 1,641,248 | Bingay | Sept. 6, 1927 |
| 1,946,959 | Auerbach | Feb. 13, 1934 |
| 2,233,235 | Witthaus | Feb. 25, 1941 |
| 2,460,741 | Friedman | Feb. 1, 1949 |
| 2,554,100 | Facchini | May 22, 1951 |
| 2,607,225 | Biscoe | Aug. 19, 1952 |
| 2,833,148 | Hoyt et al. | May 6, 1958 |
| 2,868,016 | Steed | Jan. 13, 1959 |

FOREIGN PATENTS

| | | |
|---|---|---|
| 10,246 | Great Britain | 1888 |
| 364,926 | France | June 13, 1906 |
| 597,749 | Germany | May 30, 1934 |
| 705,838 | Germany | May 12, 1941 |